(12) United States Patent
Trail et al.

(10) Patent No.: US 11,817,022 B2
(45) Date of Patent: Nov. 14, 2023

(54) CORRECTING ARTIFACTS IN TILED DISPLAY ASSEMBLIES FOR ARTIFICIAL REALITY HEADSETS

(71) Applicant: Meta Platforms Technologies, LLC, Menlo Park, CA (US)

(72) Inventors: Nicholas Daniel Trail, Bothell, WA (US); Byron Taylor, Sammamish, WA (US); Yufeng Zhu, Newcastle, WA (US); Andrew John Ouderkirk, Kirkland, WA (US); Hee Yoon Lee, Kirkland, WA (US); Sharvil Shailesh Talati, Mercer Island, WA (US); Behnam Bastani, Palo Alto, CA (US); Pasi Saarikko, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/046,644

(22) Filed: Oct. 14, 2022

(65) Prior Publication Data
US 2023/0169897 A1    Jun. 1, 2023

Related U.S. Application Data

(60) Provisional application No. 63/284,431, filed on Nov. 30, 2021.

(51) Int. Cl.
*G09G 3/00*      (2006.01)
*G02B 27/01*      (2006.01)

(52) U.S. Cl.
CPC ......... *G09G 3/003* (2013.01); *G02B 27/0172* (2013.01); *G02B 2027/0118* (2013.01);
(Continued)

(58) Field of Classification Search
USPC .......................................... 345/694
See application file for complete search history.

(56) References Cited

U.S. PATENT DOCUMENTS

10,241,328 B2 *    3/2019   Urey .................. G02B 27/0093
10,914,956 B1 *    2/2021   Trail ...................... G02B 6/122
(Continued)

OTHER PUBLICATIONS

EPO—International Search Report and Written Opinion for International Application No. PCT/US2022/051021, dated May 24, 2023, 8 pages.

*Primary Examiner* — Chineyere D Wills-Burns
(74) *Attorney, Agent, or Firm* — McDermott Will & Emery LLP

(57) ABSTRACT

A method for correcting artifacts in artificial reality headsets is provided. The method includes coupling a first image portion into a waveguide in a display for an artificial reality device, provided by a first array of pixels, coupling a second image portion into the waveguide in the display, provided by a second array of pixels, directing the first image portion through an eyebox, directing the second image portion through the eyebox, and tiling, in a user's retina, the first image portion and the second image portion to form an image having an extended field of view that includes an overlapping area comprising light provided by the first array of pixels and the second array of pixels. A system including a memory storing instructions and a processor to execute the instructions to cause the system to perform the above method are also provided.

20 Claims, 13 Drawing Sheets

(52) U.S. Cl.
CPC ............... *G09G 2300/026* (2013.01); *G09G 2320/0233* (2013.01); *G09G 2320/0626* (2013.01); *G09G 2340/12* (2013.01)

(56) References Cited

U.S. PATENT DOCUMENTS

| | | | |
|---|---|---|---|
| 11,635,624 B1* | 4/2023 | Amirsolaimani | G02B 27/286 |
| | | | 359/630 |
| 2015/0016777 A1* | 1/2015 | Abovitz | G02B 27/0093 |
| | | | 385/37 |
| 2015/0301360 A1* | 10/2015 | Chow | G02C 11/10 |
| | | | 351/158 |
| 2016/0055822 A1* | 2/2016 | Bell | G02B 27/017 |
| | | | 345/207 |
| 2017/0176755 A1* | 6/2017 | Cai | G02B 27/0179 |
| 2018/0180882 A1* | 6/2018 | Tuli | G02B 27/0012 |
| 2019/0004325 A1* | 1/2019 | Connor | G02B 27/0172 |
| 2019/0064526 A1* | 2/2019 | Connor | G02B 6/0073 |
| 2019/0113764 A1* | 4/2019 | Yamaguchi | G02B 27/0172 |
| 2021/0011303 A1* | 1/2021 | Andreev | G02B 27/58 |
| 2022/0021833 A1* | 1/2022 | Berkovich | H04N 25/79 |

* cited by examiner

CORRECTING ARTIFACTS IN TILED DISPLAY ASSEMBLIES FOR ARTIFICIAL REALITY HEADSETS

CROSS-REFERENCE TO RELATED APPLICATIONS

The present disclosure is related and claims priority under 35 U.S.C. 119(e) to U.S. Provisional Appln. No. 63/284,431, entitled CORRECTING ARTIFACTS IN TILED DISPLAY ASSEMBLIES FOR ARTIFICIAL REALITY HEADSETS, filed on Nov. 30, 2021, to Nicholas TRAIL et-al. the contents of which are herein incorporated by reference in its entirety, for all purposes.

BACKGROUND

Field

The present disclosure generally relates to headsets, and specifically relates to correcting artifacts in tiled display assemblies for both virtual reality and augmented reality (VR/AR) headsets.

Related Art

Near-eye displays and headsets are used to display visual media to users in artificial reality applications. Artificial reality headsets are designed to show users realistic media displays, such that the media covers the field of view (FOV) of a user. Artificial reality may include virtual reality (VR) systems and/or augmented reality (AR) systems that may be required to be compact and light weight, and to provide a large exit pupil with a wide field of vision for ease of use. However, designing a headset with a wide field of view can result in rather large lenses, and a relatively bulky and heavy headset, which can make it unsuitable for AR/VR (e.g., immersive reality) applications.

SUMMARY

In a first embodiment, a computer-implemented method includes coupling a first image portion into a waveguide in a headset display for an artificial reality device, the first image portion provided by a first array of pixels, coupling a second image portion into the waveguide in the headset display, the second image portion provided by a second array of pixels, directing the first image portion out of the waveguide through an eyebox delimiting a location of a user's pupil; directing the second image portion out of the waveguide through the eyebox, and tiling, in a user's retina, the first image portion and the second image portion to form an image having an extended field of view, wherein the extended field of view includes an overlapping area comprising a light provided by pixels at an edge of the first array of pixels and a light provided by pixels at an edge of the second array of pixels.

In a second embodiment, a system includes one or more processors and a memory storing instructions which, when performed by the one or more processors, cause the system to perform operations. The operations include coupling, in a virtual reality headset, a first image portion into a waveguide in a headset display for an artificial reality device, the first image portion provided by a first array of pixels, coupling, in the virtual reality headset, a second image portion into the waveguide in the headset display, the second image portion provided by a second array of pixels, directing the first image portion out of the waveguide through an eyebox delimiting a location of a user's pupil, directing the second image portion out of the waveguide through the eyebox, and tiling, in a user's retina, the first image portion and the second image portion to form an image having an extended field of view, wherein the extended field of view includes an overlapping area comprising a light provided by pixels at an edge of the first array of pixels and a light provided by pixels at an edge of the second array of pixels, wherein directing the first image portion and the second image portion out of the waveguide through the eyebox comprises utilizing a grating adjacent to the waveguide to couple light out from the waveguide in a direction of the eyebox.

In a third embodiment, a non-transitory, computer-readable medium stores instructions which, when executed by a processor, cause a computer to perform a method. The method includes coupling a first image portion into a waveguide in a headset display for an artificial reality device, the first image portion provided by a first array of pixels, coupling a second image portion into the waveguide in the headset display, the second image portion provided by a second array of pixels, directing the first image portion out of the waveguide through an eyebox delimiting a location of a user's pupil; directing the second image portion out of the waveguide through the eyebox, and tiling, in a user's retina, the first image portion and the second image portion to form an image having an extended field of view, wherein the extended field of view includes an overlapping area comprising a light provided by pixels at an edge of the first array of pixels and a light provided by pixels at an edge of the second array of pixels.

In yet other embodiments, a system includes a first means to store instructions and a second means to execute the instructions to cause the system to perform a method. The method includes coupling a first image portion into a waveguide in a headset display for an artificial reality device, the first image portion provided by a first array of pixels, coupling a second image portion into the waveguide in the headset display, the second image portion provided by a second array of pixels, directing the first image portion out of the waveguide through an eyebox delimiting a location of a user's pupil; directing the second image portion out of the waveguide through the eyebox, and tiling, in a user's retina, the first image portion and the second image portion to form an image having an extended field of view, wherein the extended field of view includes an overlapping area comprising a light provided by pixels at an edge of the first array of pixels and a light provided by pixels at an edge of the second array of pixels.

In the figures, elements having the same or similar label share the same or similar features, unless expressly stated otherwise.

DETAILED DESCRIPTION

Embodiments described herein relate to tiled displays for use in artificial reality headsets. A headset includes a display block for each eye. A display block generates image light and presents the image light to a corresponding eyebox of the headset. The display block includes a plurality of display assemblies that are assembled such that light emitted from each of the plurality of display assemblies are tiled together to form a tiled FOV. A display assembly may be, e.g., a waveguide display, an electronic display, a projector display, or some other device that generates at least a portion of the image light, or some combination thereof. The display block includes at least a first display assembly and a second display assembly (also referred to as a peripheral display assembly) that are tiled such that the first display assembly emits a first portion of the image light over a first FOV, and the second display assembly emits a second portion of the image light over a second FOV. The first display assembly covers the forward looking FOV plus field of view in the periphery. The second display assembly also covers the forward looking FOV overlapping the first display assembly FOV. The second display assembly covers the complementary periphary FOV so that, for example, a full field of view covering 90×90 degrees is presented to the user. The second display assembly is positioned to be a peripheral display whose FOV is at least a threshold distance from the central region. For example, the FOV of a second display assembly may correspond to the eye looking towards a temple of the user (e.g., to a user's right or left). In some embodiments, the first FOV and the second FOV overlap.

Example System Architecture

Figure 1:
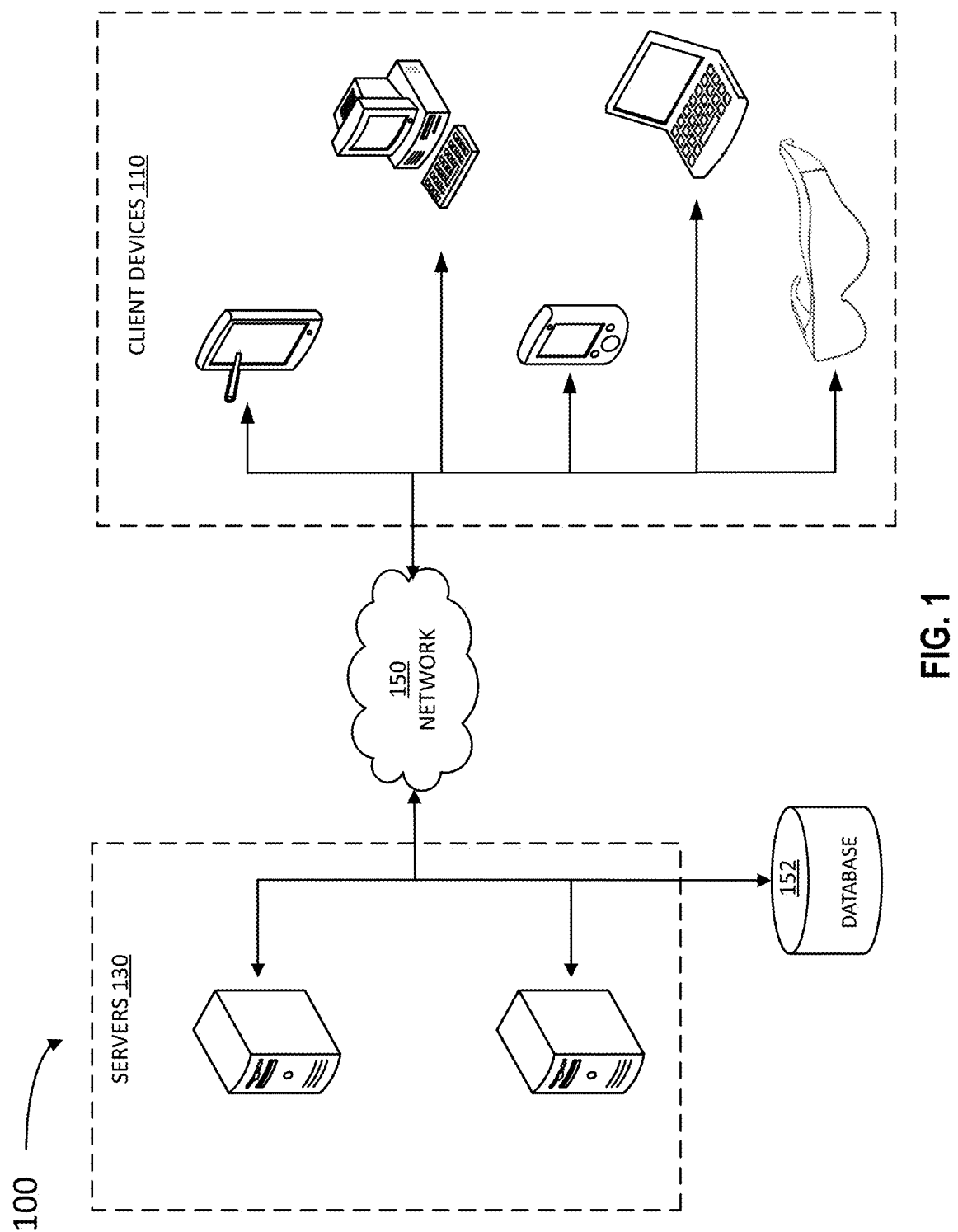
FIG. 1 illustrates an example architecture suitable for correcting artifacts in an augmented reality headset, according to some embodiments.

FIG. 1 illustrates an example architecture 100 suitable for correcting artifacts in an augmented reality headset, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a display in one of client devices 110 to provide an augmented reality view to the user. For purposes of load balancing, multiple servers 130 can host memories including instructions to one or more processors, and multiple servers 130 can host a history log and a database 152 including multiple media files and recordings of augmented reality environments. Moreover, in some embodiments, multiple users of client devices 110 may access the same immersive reality environment or run the same augmented reality application, interactively. Accordingly, client devices 110 may communicate with each other via network 150 and through access to one or more servers 130 and resources located therein.

Servers 130 may include any device having an appropriate processor, memory, and communications capability for hosting an immersive reality application including multiple tools associated with it. The augmented reality application may be accessible by various clients 110 over network 150. Client devices 110 can be, for example, desktop computers, mobile computers, tablet computers (e.g., including e-book readers), mobile devices (e.g., a smartphone or PDA), or any other device having appropriate processor, memory, and communications capabilities for accessing the augmented reality application on one or more of servers 130. In some embodiments, a client device 110 may include a virtual reality or augmented reality (VR/AR) headset, an immersive reality headset, or a smart glass. Accordingly, an application installed in the headset may use a 3D rendering model to create an immersive reality environment through the headset display. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
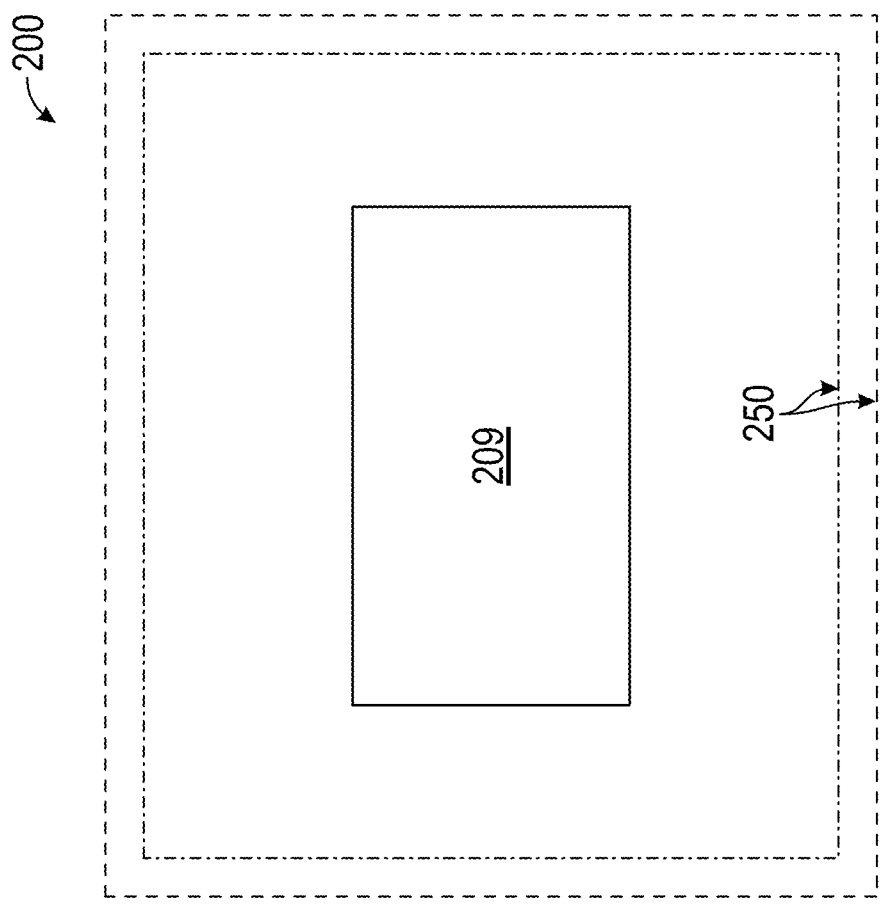
FIG. 2 illustrates a vertically tiled display assembly for an augmented reality headset, according to some embodiments.
Figure 2:
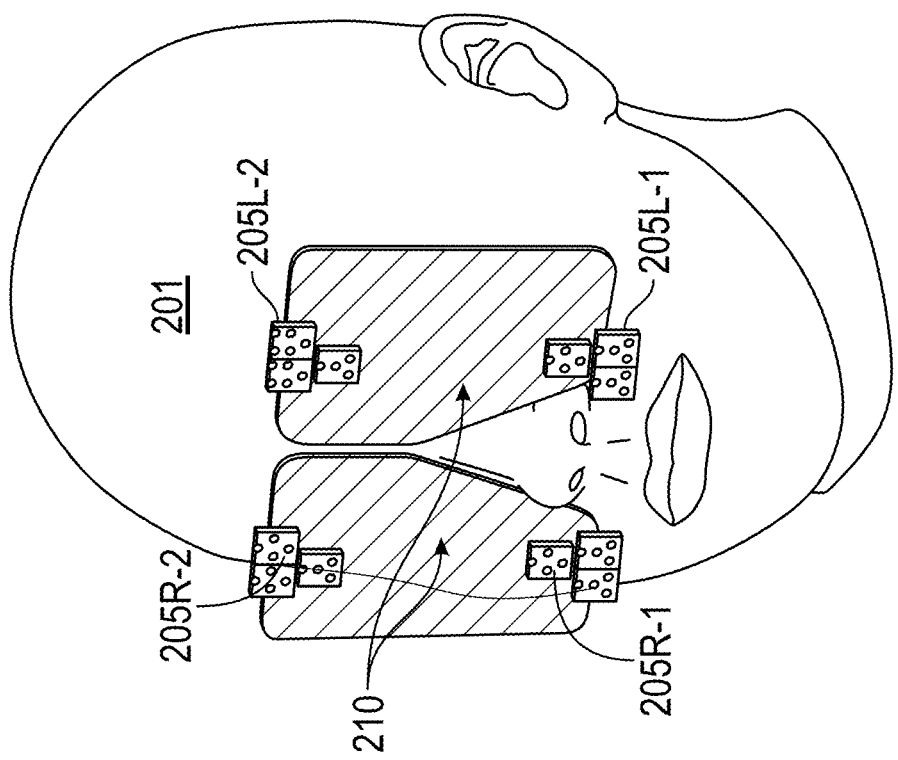

FIG. 2 illustrates a vertically tiled display assembly 200 for an augmented reality headset 210 on a user 201, according to some embodiments. In some embodiments, as illustrated, tiled display assembly 200 includes two vertically disposed projectors 205R-1, 205R-2, 205L-1, and 205L-2 for each of the eyes (R, L) of the user (hereinafter, collectively referred to as "projectors 205"). Display assembly 200 includes compact tiling displays 250 that use multiple waveguides to stitch together a wide field of view and builds off projectors 205 and waveguides, and infrastructure used in conventional displays. In some embodiments, tiled displays 250 may cover a 90° (Horizontal)×90° (Vertical) FOV and be a few millimetres thick (far wider than the FOV of a regular display 209). The reduced thickness of tiled displays 250 enables the use of headset 210 for see-through applications (e.g., for augmented reality), thus blurring the boundary between AR and VR.

Figure 3:
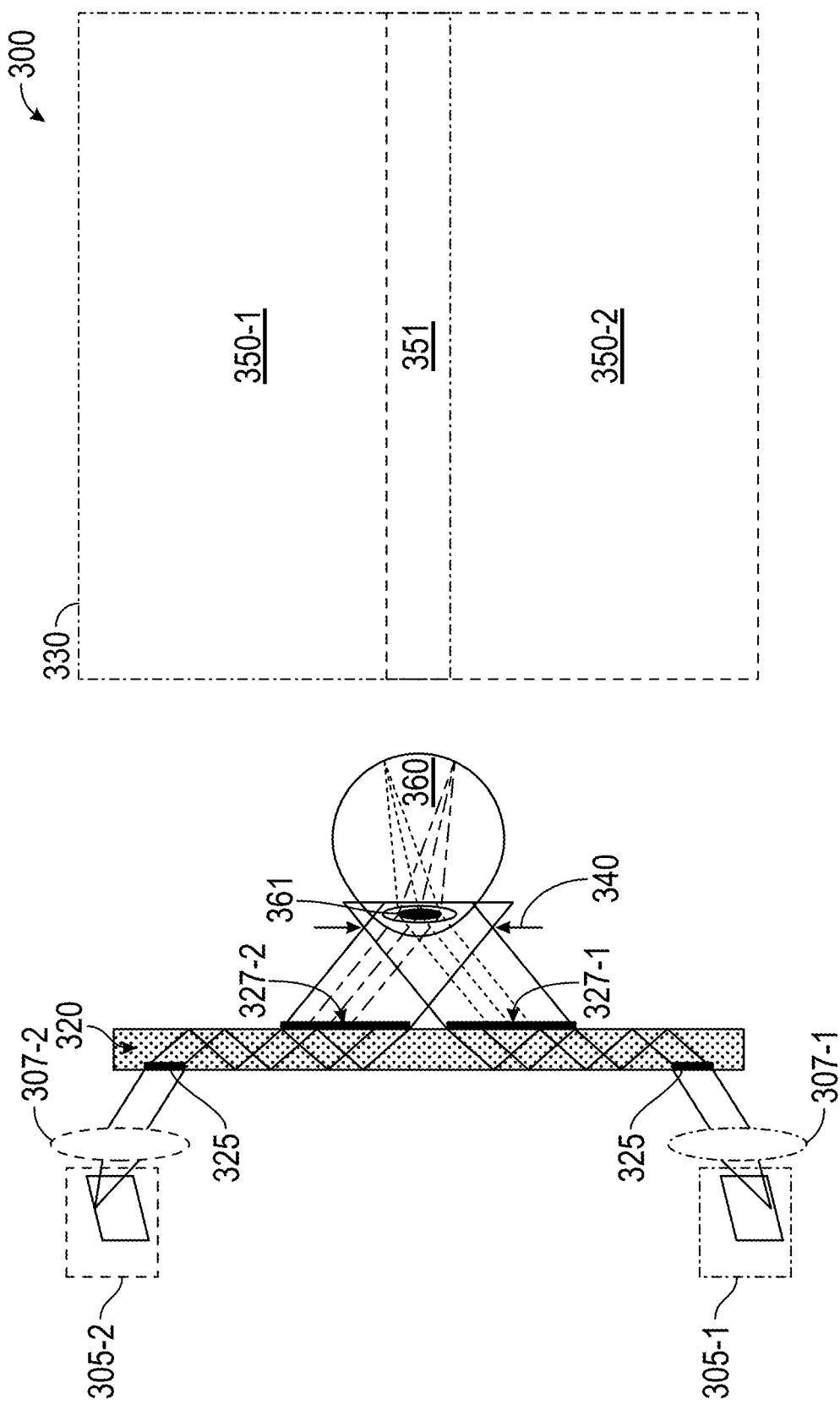
FIG. 3 illustrates a cross sectional view of the vertically tiled display assembly of FIG. 1, according to some embodiments.

FIG. 3 illustrates a cross sectional view of a vertically tiled display assembly 300 (albeit for one eye only). The two displays: "Top Tile" 350-1 and "Bottom Tile" 350-2, hereinafter, collectively referred to as "tiles 350," are tiled/stitched together to form a full scene (e.g., "tiled image 330") including an overlapping region 351 between top tile 350-1 and bottom tile 350-2, according to some embodiments. Note that, given the particulars of the optics used, a bottom projector 305-1 generates top tile 350-1, and a top projector 305-2 generates bottom tile 350-2 for the user's FOV. Projectors 305-1 and 305-2 will be collectively referred to, hereinafter, as "projectors 305." In some embodiments, projectors 305 may be disposed horizontally, side-by-side (e.g., in a left-right configuration), rather than vertically, in a top-bottom configuration, without loss of generality and consistent with embodiments disclosed herein. Accordingly, overlapping region 351 of tiled image 330 includes pixels corresponding to one or more top horizontal lines in bottom projector 305-1, and one or more bottom horizontal lines from top projector 305-2.

Projectors 305 include arrays of pixels generating light that forms a first image portion and a second image portion. Each pixel in the pixel arrays may include three light emitting diodes (LEDs, for emitting Red, Green, and Blue light, RGB, respectively). A collimating lens 307-1 or 307-2 (hereinafter, collectively referred to as "collimating lenses 307") or other suitable optics collect the light from the pixels in projectors 305 and couples it into a planar waveguide 320 via an input coupler 325 (e.g., a diffraction grating). The light propagates through planar waveguide 320 until it reaches output couplers 327-1 and 327-2 (hereinafter, collectively referred to as "output couplers 327"), which may be a passive diffraction grating, an externally activated diffraction grating, or some other output coupler. Output couplers 327 direct the light to a user's eye 360 via an eyebox 340, which is a region in space delimiting the position of the user's pupil 361.

In general, planar waveguide 320 transmits the light from projectors 305 via total internal reflection. The in-coupling and out-coupling efficiency input coupler 325 and output couplers 327 into planar waveguide 320 is dependent on the incident angle of the light as it is coupled into waveguide 320, which in turn depends on where in the pixel array the light is coming from (e.g., within either of the top and bottom projectors).

Figure 4:
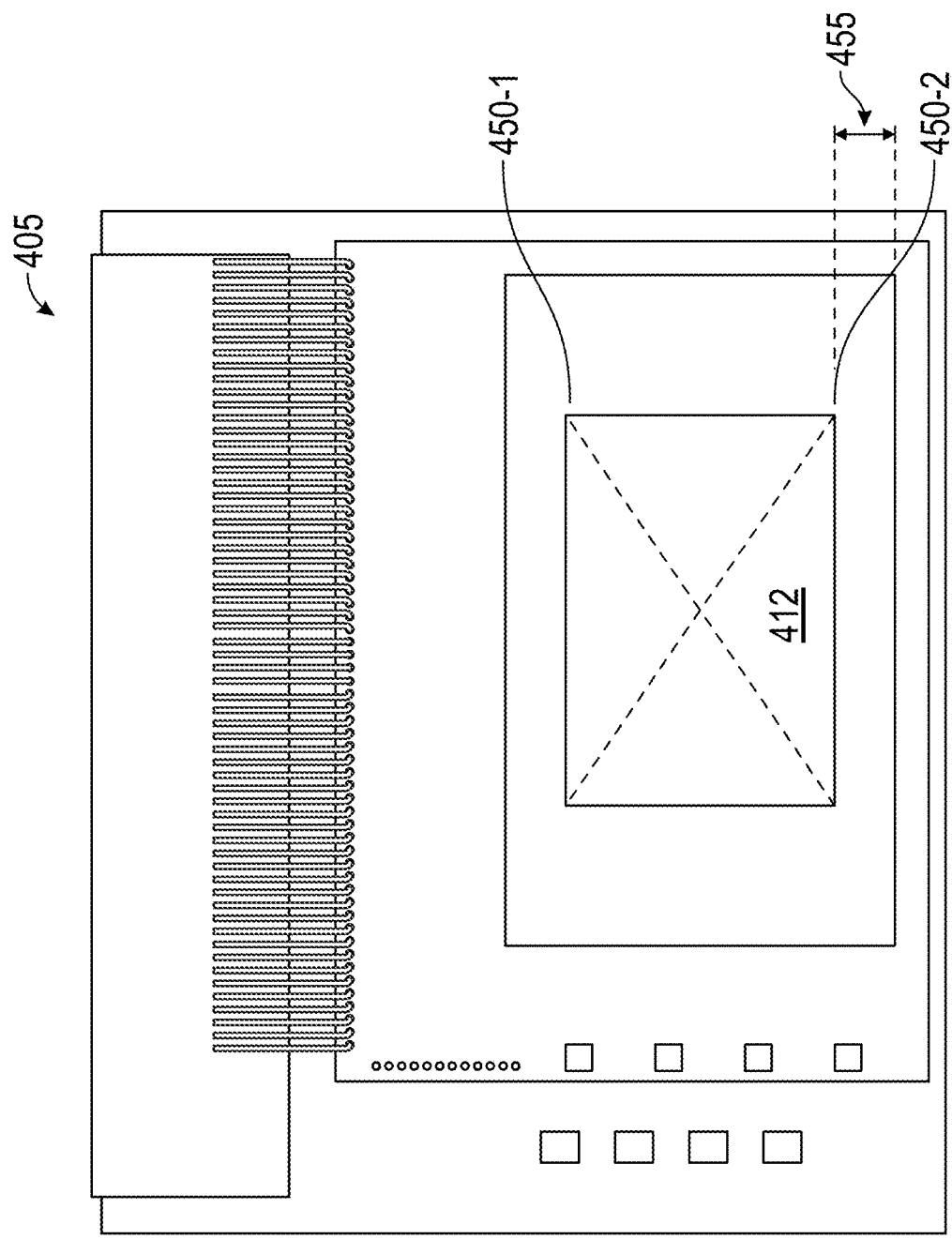
FIG. 4 illustrates a pixel array in a display assembly for an augmented reality headset, according to some embodiments.

FIG. 4 illustrates a pixel array 412 in a projector 405 for an augmented reality headset, according to some embodiments. In some embodiments, some of the edge pixels 455 may be left "off" during operation of the device, based on the efficiency of waveguide transmission for these border area pixels (e.g., pixels at the bottom of projector 405 may produce light impinging on the waveguide at a steeper angle, thus having a less propagation efficiency therethrough). Without loss of generality, projector 405 may be disposed on the lower end of a display assembly (cf. projectors 205R-1, 205L-1, and 305-1), and the active area of the bottom LED panel or pixel array includes a coverage between upper limit 450-1 (+45 degrees) and lower limit 450-2 (−5 degrees) in the vertical direction (cf., top tile 350-1). Likewise, the active area of a bottom LED panel or pixel array may include a coverage of (+5, −45) degrees in the vertical direction. Other combination of angles may be possible for the upper and lower limits of the bottom and top LED panels, such as, in degrees, (+50, −5), (+50, −10), (+60, −10), (+60, −5) for the bottom LED panel and (+5, −50), (+10, −50), (+10, −60), (+5, −60) for the top LED panel, respectively. Further combination of angular coverage may be envisioned according to desired FOV and technical capabilities of the optical components used.

Figure 5:
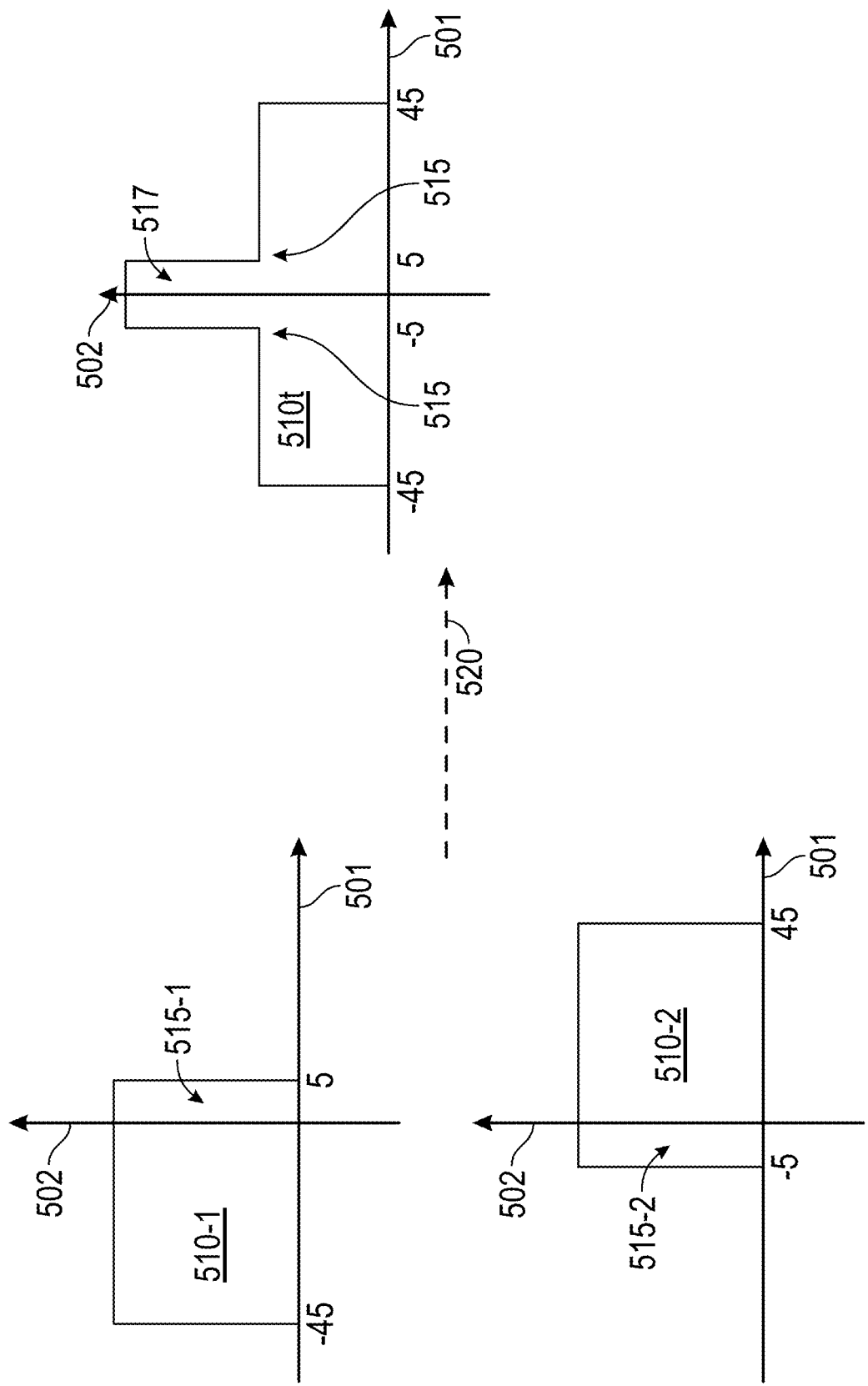
FIG. 5 illustrates a brightness distribution for a top and bottom pixel array, and a total brightness distribution as a function of vertical field angle, according to some embodiments.

FIG. 5 illustrates distributions 510-1, 510-2 for a top and bottom projector, and a total distribution 510t of brightness 502 as a function of vertical field angle 501, according to some embodiments. Total distribution 510t is the result of tiling 520 distributions 510-1 and 510-2 from bottom and top projectors, respectively. Distributions 510-1, 510-2, and 510t will be collectively referred to, hereinafter, as "distributions 510." Clearly, a hard FOV boundary (distribution 510-1) is created in an overlapping region 515-1 reaching (0, 5) degrees from a bottom projector (e.g., projectors 205R-1, 205L-1, and 305-1). Distribution 510-2 from a bottom projector, includes an overlapping region 515-2 (hereinafter, collectively referred to as "overlapping regions 515"), covering (−5, 0) degrees of vertical. Accordingly, tiling 520 results in a tiling artifact 517 that is clearly visible.

Figure 6:
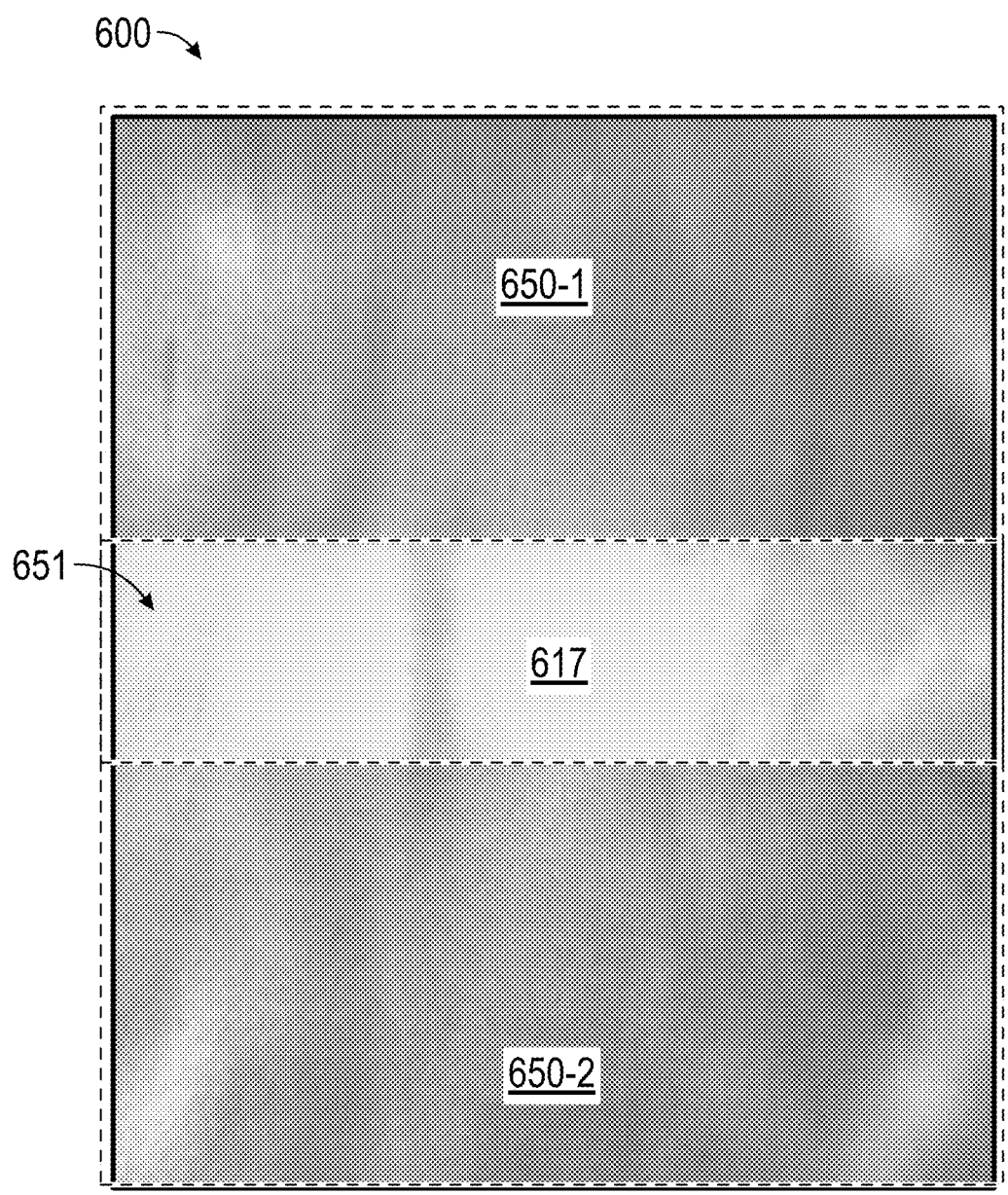
FIG. 6 illustrates an uncorrected tiling artifact in an overlapping area of a tiled image having an extended field of view, according to some embodiments.

FIG. 6 illustrates an uncorrected tiling artifact 617 in an overlapping area 651 from a top portion 650-1 and a bottom portion 650-2 of a tiled image 600 having an extended field of view, according to some embodiments. Artifact 617 corresponds to one specific color (e.g., green), but it is expected to appear on one or more, or all of the colors used in the projectors. According to the laws of human color perception, the reaction of the user to artifact 617 may depend on the variation in brightness and on the color, but generally it may be expected that such an effect should desirably be removed to improve user experience.

Figure 7:
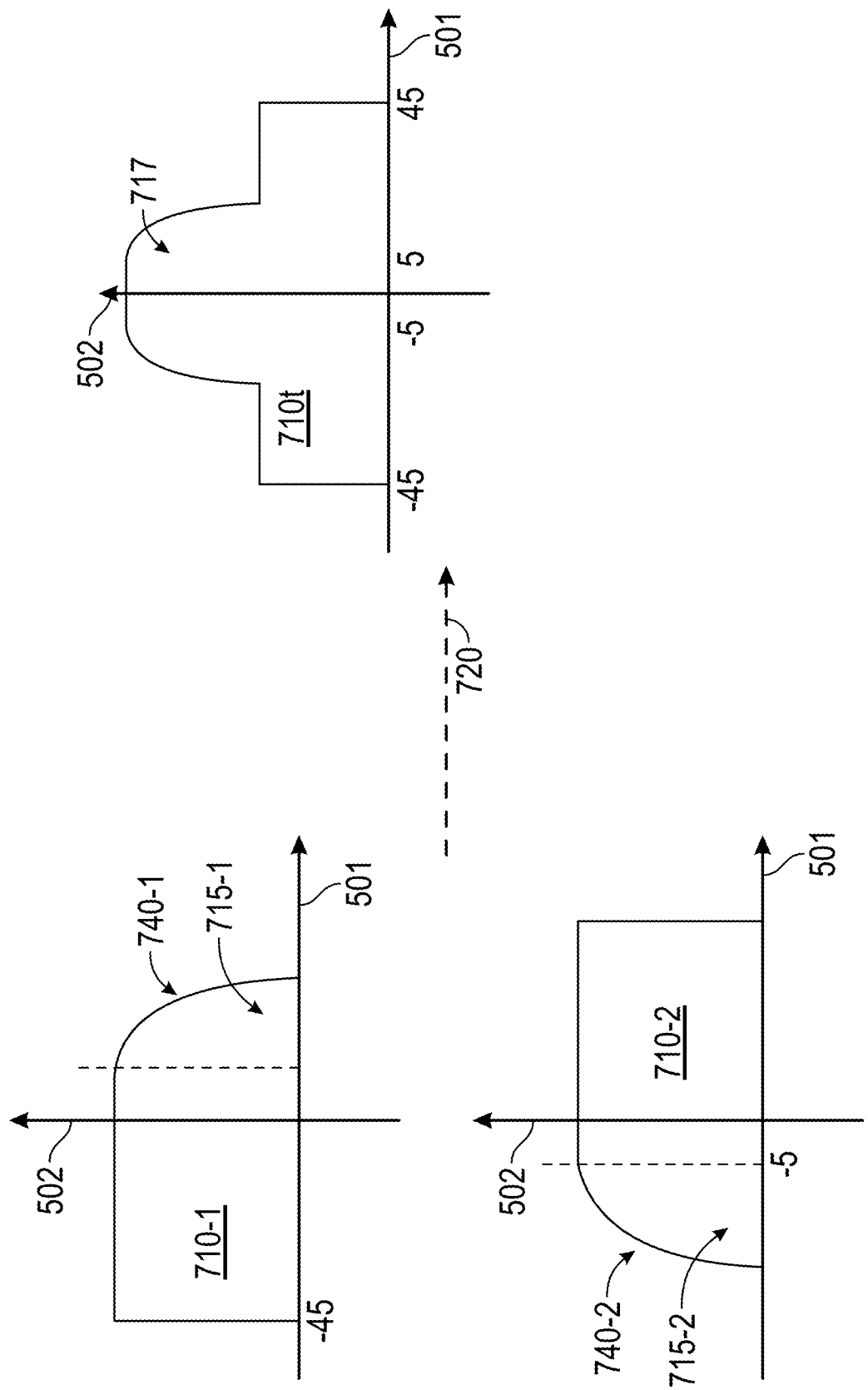
FIG. 7 illustrates a brightness distribution for a top and bottom pixel array including a waveguide efficiency roll-off, and a total brightness distribution as a function of vertical field angle, according to some embodiments.

FIG. 7 illustrates distributions 710-1 and 710-2 for a top and bottom projector including waveguide efficiency roll-offs 740-1 and 740-2 (hereinafter, collectively referred to as "efficiency roll-offs 740"), and a total distribution 710t of brightness 502 as a function of vertical field angle 501, according to some embodiments. Total distribution 710t is the result of tiling 720 distributions 710-1 and 710-2 from bottom and top projectors, respectively. Distributions 710-1, 710-2, and 710t will be collectively referred to, hereinafter, as "distributions 710." Accordingly, when border extra pixels are turned "on" efficiency roll-offs 740 generate a soft FOV boundary in overlapping areas 715-1 and 715-2 (hereinafter, collectively referred to as "overlapping areas 715"). Efficiency roll-offs 740 are due to a steeper angle of incidence of the light beams corresponding to the edge pixels in the top and bottom projectors (cf. projectors 205R-1, 205L-1, and 305). An overlapping brightness artifact 717 is significantly mitigated, as the human eye loses perceptivity of a slowly varying brightness distribution. In some embodiments, even without a direct software intervention to modulate the brightness of the light emitted by the pixels in the edge of the top and bottom arrays, and even when the measured brightness across the entire FOV may not be entirely uniform, efficiency roll-offs 740 may create a smooth brightness gradation that is imperceptible or not bothersome, or even appealing to the human eye.

Figure 8:
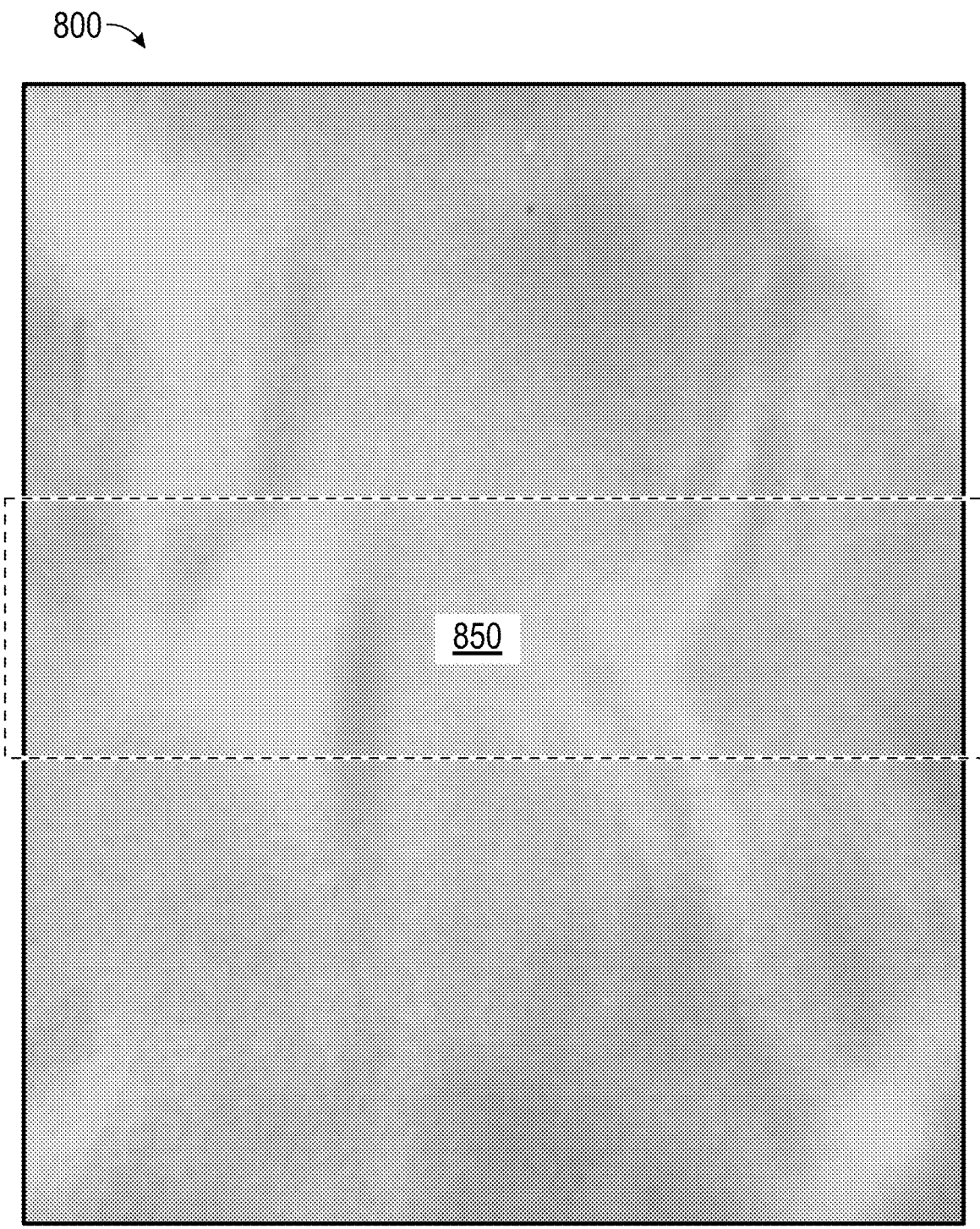
FIG. 8 illustrates a mitigated tiling artifact in an overlapping area of a tiled image having an extended field of view, according to some embodiments.

FIG. 8 illustrates a mitigated tiling artifact in an overlapping area 850 of a tiled image 800 having an extended field of view, according to some embodiments. In some embodiments, the mitigated tiling effect may be the result of a natural waveguide efficiency roll-off, as discussed above.

Figure 9:
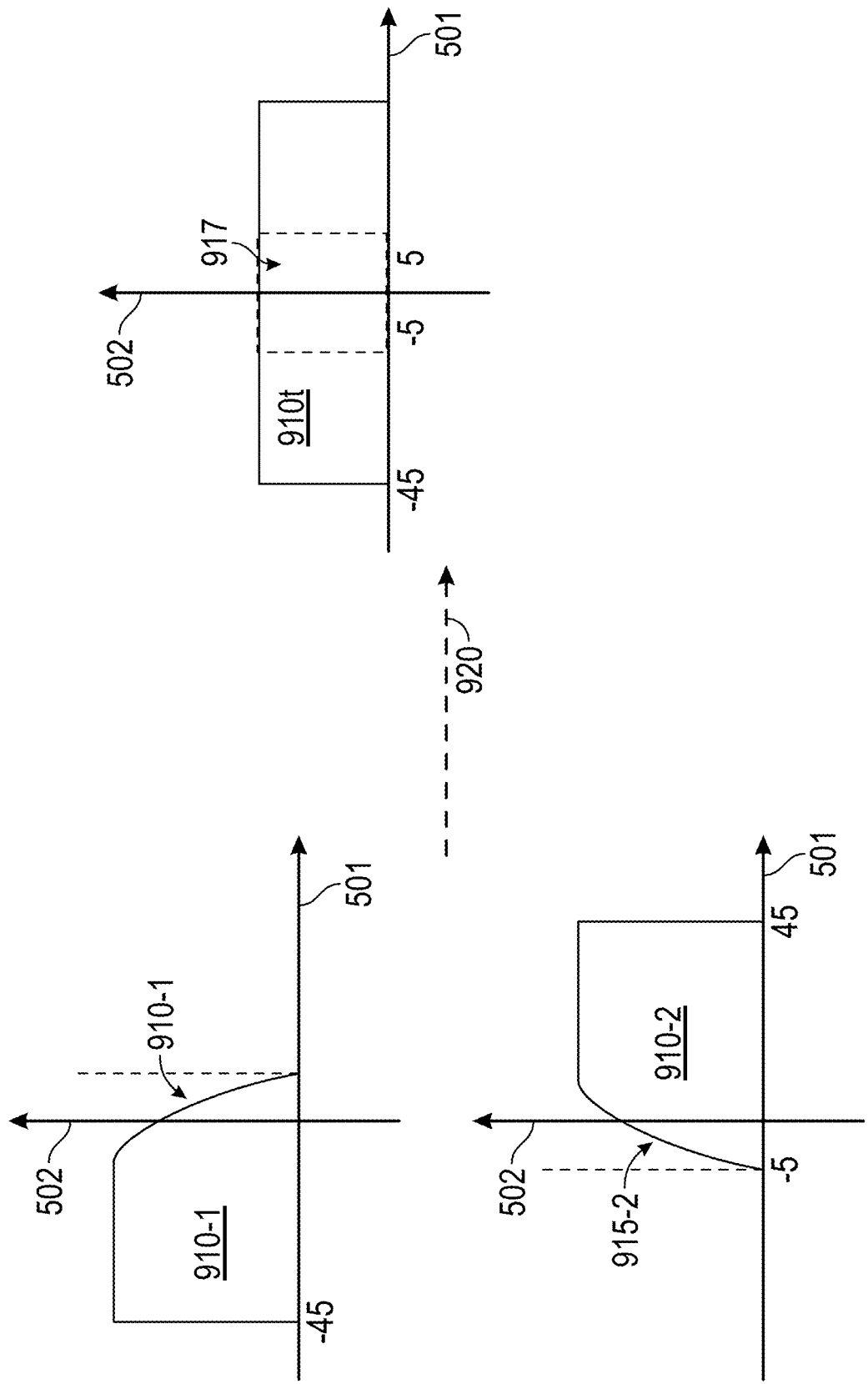
FIG. 9 illustrates a brightness distribution for a top and bottom pixel array including a software controlled roll-off, and a total brightness distribution as a function of vertical field angle, according to some embodiments.

FIG. 9 illustrates distributions 910-1, 910-2 for a top and bottom pixel array including a software controlled roll-off 915-1 and 915-2 (hereinafter, collectively referred to as "controlled roll-offs 915"), and a total distribution 910t of brightness 502 as a function of vertical field angle 501, according to some embodiments. Total distribution 910t is the result of tiling 920 distributions 910-1 and 910-2 from bottom and top projectors, respectively. Distributions 910-1, 910-2, and 910t will be collectively referred to, hereinafter, as "distributions 910." In some embodiments, controlled roll-offs 915 include a digital "Feathering" to create a soft transition at the overlapping region 917 from −5 to 5 degrees vertically, to correct tiling artifacts. The advantage of using a software correction in combination with passive efficiency roll-off (cf. efficiency roll-offs 740) is that the resulting brightness distribution 910t may be adjusted to be as uniform as desired (e.g., almost, substantially, or completely "flat").

Figure 10:
FIG. 10 illustrates a software-corrected tiling artifact in an overlapping area of a tiled image having an extended field of view, according to some embodiments.

FIG. 10 illustrates a software-corrected tiling artifact 1050 in an overlapping area of a tiled image 1000 having an extended field of view, according to some embodiments. As can be seen, tiling artifact 1050 is hardly noticeable, as desired.

Figure 11:
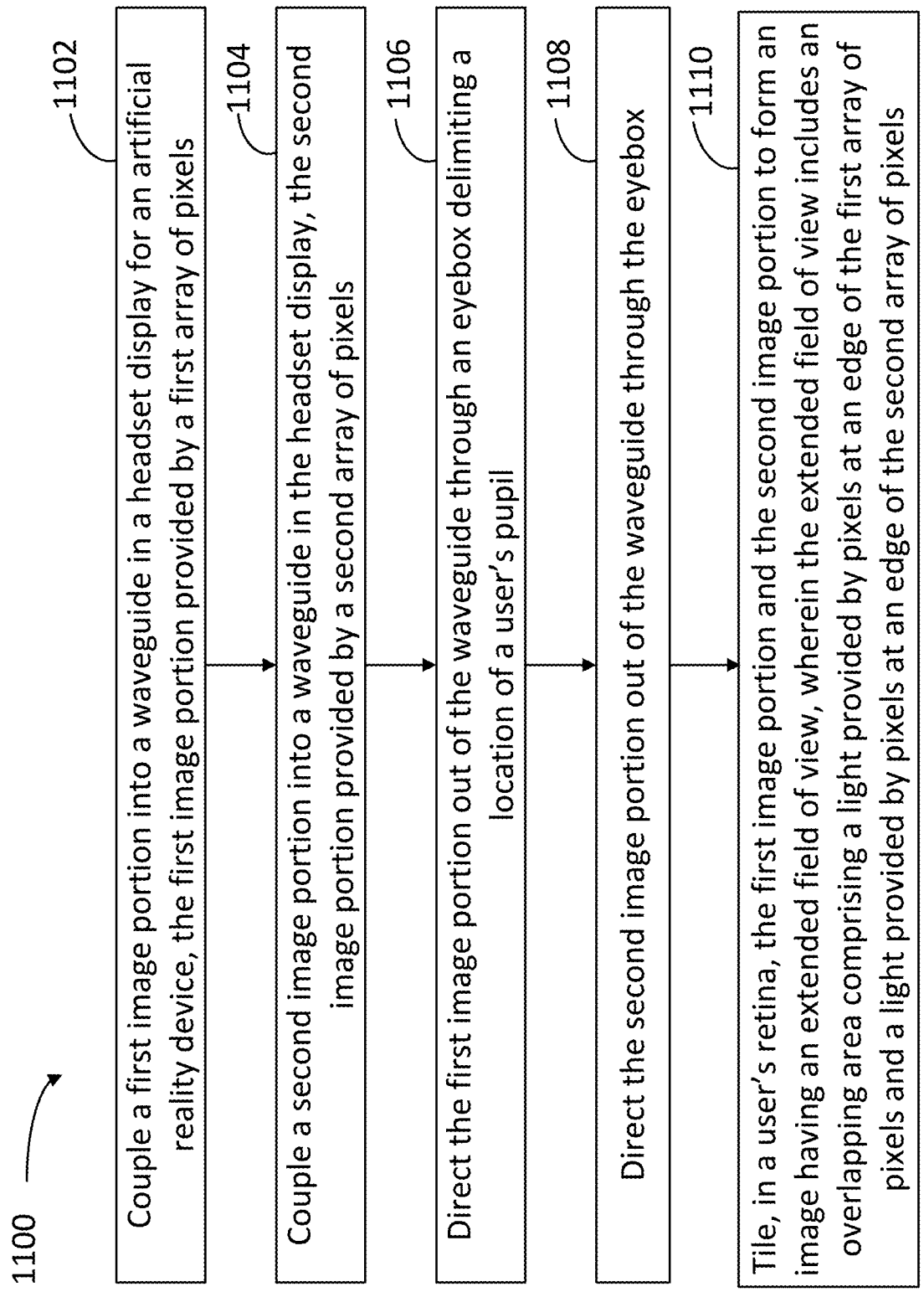
FIG. 11 is a flow chart illustrating steps in a method for providing a tiled display in an augmented reality headset, according to some embodiments.

FIG. 11 is a flow chart illustrating steps in a method 1100 for providing a tiled display in an augmented reality headset, according to some embodiments. In some embodiments, at least one or more steps in method 1100 may be performed by a processor circuit executing instructions stored in a memory circuit for a computer or a computer system, as disclosed herein. In some embodiments, the augmented reality headset may include a projector having a pixel array and an optical element configured to project an image onto a planar waveguide forming the tiled display (cf. projectors 205, 305, lens 307, planar waveguide 320). The projector may include a top projector providing a bottom image and a bottom projector providing a top image. The bottom and top images are tiled into an extended FOV image, as disclosed herein. In some embodiments, methods consistent with the present disclosure may include at least one or more steps in method 1100 performed in a different order, simultaneously, quasi-simultaneously, or overlapping in time.

Step 1102 includes coupling a first image portion into a waveguide in a headset display for an artificial reality device, the first image portion provided by a first array of pixels.

Step 1104 includes coupling a second image portion into the waveguide in the headset display, the second image portion provided by a second array of pixels. In some embodiments, step 1104 includes selecting pixels from the first array of pixels such that the first image portion covers a vertical field of view from −45 degrees to +5 degrees, and the second image portion covers a vertical field of view from −5 degrees to +45 degrees. In some embodiments, steps 1102 or 1104 include coupling the light provided by pixels at an edge of the first array of pixels or at an edge of the second array of pixels at an angle such that a transmission efficiency through the waveguide is reduced, to provide a uniform brightness to the image having an extended field of view, including the overlapping area. In some embodiments, step 1104 includes adjusting a brightness of the light provided by pixels at an edge of the first array of pixels based on a coupling efficiency of the waveguide for the light provided by pixels at the edge of the first array of pixels, to provide a uniform brightness to the image having an extended field of view, including the overlapping area. In some embodiments, step 1104 includes reducing a brightness of the light provided by pixels at the edge of the first array of pixels and reducing the brightness of the light provided by pixels at the edge of the second array of pixels so that a brightness of the overlapping area is similar to a brightness of a non-overlapping area of the image having an extended field of view.

Step 1106 includes directing the first image portion out of the waveguide through an eyebox delimiting a location of a user's pupil. In some embodiments, step 1106 includes coupling light out from the waveguide in a direction of the eyebox via a diffraction grating adjacent to the waveguide.

Step 1108 includes directing the second image portion out of the waveguide through the eyebox.

Step 1110 includes tiling, in a user's retina, the first image portion and the second image portion to form an image having an extended field of view, wherein the extended field of view includes an overlapping area including a light provided by pixels at an edge of the first array of pixels and a light provided by pixels at an edge of the second array of pixels. In some embodiments, step 1110 includes vertically tiling the first image portion above the second image portion in the user's retina. In some embodiments, step 1110 includes gradually increasing from zero a brightness of a light provided by pixels from the second array of pixels that cover a vertical field of view from −5 degrees to 0 degrees. In some embodiments, step 1110 includes adjusting a brightness of the light provided by pixels at an edge of the first array of pixels and a brightness of the light provided by pixels at an edge of the second array of pixels to provide a uniform brightness to the image having an extended field of view, including the overlapping area.

Figure 12:
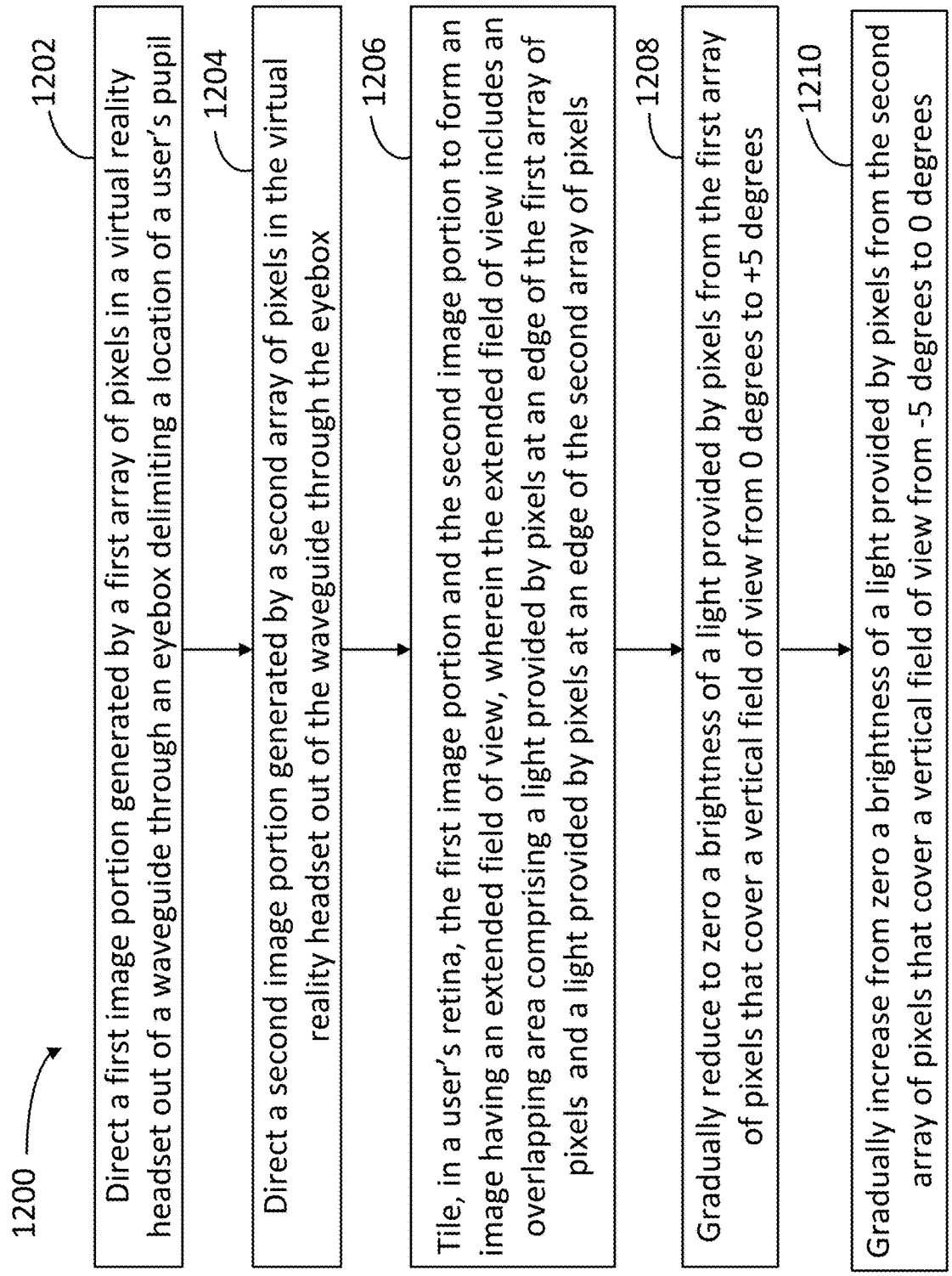
FIG. 12 is a flow chart illustrating steps in a method for providing a tiled display in an augmented reality headset, according to some embodiments.

FIG. 12 is a flow chart illustrating steps in a method 1200 for providing a tiled display in an augmented reality headset, according to some embodiments. In some embodiments, at least one or more steps in method 1200 may be performed by a processor circuit executing instructions stored in a memory circuit for a computer or a computer system, as disclosed herein. In some embodiments, the augmented reality headset may include a projector having a pixel array and an optical element configured to project an image onto a planar waveguide forming the tiled display (cf. projectors 205, 305, lens 307, planar waveguide 320). The projector may include a top projector providing a bottom image and a bottom projector providing a top image. The bottom and top images are tiled into an extended FOV image, as disclosed herein. In some embodiments, methods consistent with the present disclosure may include at least one or more steps in method 1200 performed in a different order, simultaneously, quasi-simultaneously, or overlapping in time.

Step 1202 includes directing a first image portion generated by a first array of pixels in a virtual reality headset out of a waveguide through an eyebox delimiting a location of a user's pupil.

Step 1204 includes directing a second image portion generated by a second array of pixels in the virtual reality headset out of the waveguide through the eyebox.

Step 1206 includes tiling, in a user's retina, the first image portion and the second image portion to form an image having an extended field of view, wherein the extended field of view includes an overlapping area including a light provided by pixels at an edge of the first array of pixels and a light provided by pixels at an edge of the second array of pixels.

Step 1208 includes gradually reducing to zero a brightness of a light provided by pixels from the first array of pixels that cover a vertical field of view from 0 degrees to +5 degrees.

Step 1210 includes gradually increasing from zero a brightness of a light provided by pixels from the second array of pixels that cover a vertical field of view from −5 degrees to 0 degrees. In some embodiments, steps 1208 and 1210 include adjusting a brightness of the light provided by pixels at an edge of the first array of pixels based on a coupling efficiency of the waveguide for the light provided by pixels at the edge of the first array of pixels, to provide a uniform brightness to the image having an extended field of view, including the overlapping area. In some embodiments, steps 1208 and 1210 include verifying that a brightness of the overlapping area is similar to a brightness of a non-overlapping area of the image having an extended field of view. In some embodiments, steps 1208 and 1210 include selecting pixels from the first array of pixels such that the first image portion covers a vertical field of view from −45 degrees to +5 degrees, and the second image portion covers a vertical field of view from −5 degrees to +45 degrees. In some embodiments, steps 1208 and 1210 include gradually reducing to zero a brightness of a light provided by pixels from the edge of the first array of pixels, and gradually increasing from zero a brightness of a light provided by pixels from the edge of the second array of pixels.

Hardware Overview

Figure 13:
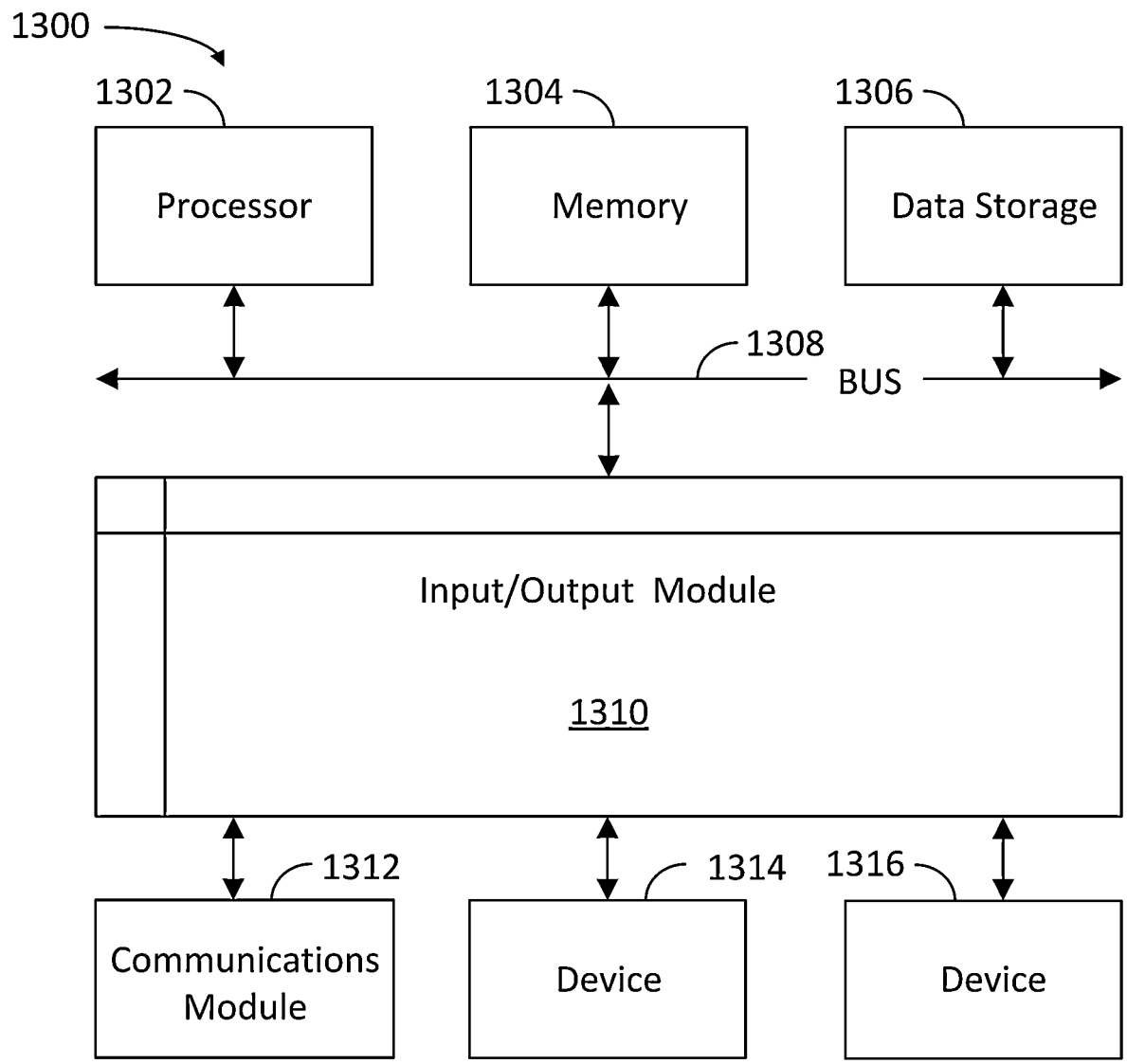
FIG. 13 is a block diagram illustrating an example computer system with which the client and server of FIGS. 1 and 2 and the methods of FIGS. 11-12 can be implemented.

FIG. 13 is a block diagram illustrating an exemplary computer system 1300 with which the client and server of FIGS. 1 and 2, and the methods of FIGS. 11 and 12 can be implemented. In certain aspects, the computer system 1300 may be implemented using hardware or a combination of software and hardware, either in a dedicated server, or integrated into another entity, or distributed across multiple entities.

Computer system 1300 (e.g., client 110 and server 130) includes a bus 1308 or other communication mechanism for communicating information, and a processor 1302 coupled with bus 1308 for processing information. By way of example, the computer system 1300 may be implemented with one or more processors 1302. Processor 1302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1300 can include, in addition to hardware, code that creates an execution environment for the computer program in question, e.g., code that constitutes processor firmware, a protocol stack, a database management system, an operating system, or a combination of one or more of them stored in an included memory 1304, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1308 for storing information and instructions to be executed by processor 1302. The processor 1302 and the memory 1304 can be supplemented by, or incorporated in, special purpose logic circuitry.

The instructions may be stored in the memory 1304 and implemented in one or more computer program products, e.g., one or more modules of computer program instructions encoded on a computer-readable medium for execution by, or to control the operation of, the computer system 1300, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, and xml-based languages. Memory 1304 may also be used for storing temporary variable or other intermediate information during execution of instructions to be executed by processor 1302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1300 further includes a data storage device 1306 such as a magnetic disk or optical disk, coupled to bus 1308 for storing information and instructions. Computer system 1300 may be coupled via input/output module 1310 to various devices. Input/output module 1310 can be any input/output module. Exemplary input/output modules 1310 include data ports such as USB ports. The input/output module 1310 is configured to connect to a communications module 1312. Exemplary communications modules 1312 include networking interface cards, such as Ethernet cards and modems. In certain aspects, input/output module 1310 is configured to connect to a plurality of devices, such as an input device 1314 and/or an output device 1316. Exemplary input devices 1314 include a keyboard and a pointing device, e.g., a mouse or a trackball, by which a user can provide input to the computer system 1300. Other kinds of input devices 1314 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1316 include display devices, such as an LCD (liquid crystal display) monitor, for displaying information to the user.

According to one aspect of the present disclosure, the client 110 and server 130 can be implemented using a computer system 1300 in response to processor 1302 executing one or more sequences of one or more instructions contained in memory 1304. Such instructions may be read into memory 1304 from another machine-readable medium, such as data storage device 1306. Execution of the sequences of instructions contained in main memory 1304 causes processor 1302 to perform the process steps described herein. One or more processors in a multi-processing arrangement may also be employed to execute the sequences of instructions contained in memory 1304. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1300 can include clients and servers. A client and server are generally remote from each other and typically interact through a communication network. The relationship of client and server arises by virtue of computer programs running on the respective computers and having a client-server relationship to each other. Computer system 1300 can be, for example, and without limitation, a desktop computer, laptop computer, or tablet computer. Computer system 1300 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1302 for execution. Such a medium may take many forms, including, but not limited to, non-volatile media, volatile media, and transmission media. Non-volatile media include, for example, optical or magnetic disks, such as data storage device 1306. Volatile media include dynamic memory, such as memory 1304. Transmission media include coaxial cables, copper wire, and fiber optics, including the wires forming bus 1308. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
    coupling a first image portion into a waveguide in a headset display for an artificial reality device, the first image portion provided by a first array of pixels;
    coupling a second image portion into the waveguide in the headset display, the second image portion provided by a second array of pixels;
    directing the first image portion out of the waveguide through an eyebox delimiting a location of a user's pupil;
    directing the second image portion out of the waveguide through the eyebox; and
    tiling, in a user's retina, the first image portion and the second image portion to form an image having an extended field of view, wherein the extended field of view includes an overlapping area comprising a light provided by pixels at an edge of the first array of pixels and a light provided by pixels at an edge of the second array of pixels.

2. The computer-implemented method of claim 1, wherein directing the first image portion and the second image portion out of the waveguide through the eyebox comprises activating a grating adjacent to the waveguide to couple light out from the waveguide in a direction of the eyebox.

3. The computer-implemented method of claim 1, wherein tiling the first image portion and the second image portion to form an image having an extended field of view comprises vertically tiling the first image portion above the second image portion in the user's retina.

4. The computer-implemented method of claim 1, further comprising selecting pixels from the first array of pixels such that the first image portion covers a vertical field of view from about −45 degrees to about +5 degrees, and the second image portion covers a vertical field of view from about −5 degrees to about +45 degrees.

5. The computer-implemented method of claim 1, further comprising gradually reducing to zero a brightness of a light provided by pixels from the first array of pixels that cover a vertical field of view from about −5 degrees to about +5 degrees.

6. The computer-implemented method of claim 1, further comprising gradually increasing from zero a brightness of a light provided by pixels from the second array of pixels that cover a vertical field of view from about −5 degrees to about +5 degrees.

7. The computer-implemented method of claim 1, further comprising adjusting a brightness of the light provided by pixels at an edge of the first array of pixels and a brightness of the light provided by pixels at an edge of the second array of pixels to provide a uniform brightness to the image having an extended field of view, including the overlapping area.

8. The computer-implemented method of claim 1, wherein coupling the first image portion and the second image portion into the waveguide comprises coupling the light provided by pixels at an edge of the first array of pixels or at an edge of the second array of pixels at an angle such that a transmission efficiency through the waveguide is reduced, to provide a uniform brightness to the image having an extended field of view, including the overlapping area.

9. The computer-implemented method of claim 1, further comprising adjusting a brightness of the light provided by pixels at an edge of the first array of pixels based on a coupling efficiency of the waveguide for the light provided by pixels at the edge of the first array of pixels, to provide a uniform brightness to the image having an extended field of view, including the overlapping area.

10. The computer-implemented method of claim 1, further comprising reducing a brightness of the light provided by pixels at the edge of the first array of pixels and reducing the brightness of the light provided by pixels at the edge of the second array of pixels so that a brightness of the overlapping area is similar to a brightness of a non-overlapping area of the image having an extended field of view.

11. A system, comprising:
    one or more processors; and
    a memory storing instructions which, when performed by the one or more processors, cause the system to:

couple, in an immersive reality headset, a first image portion into a waveguide in a headset display for an artificial reality device, the first image portion provided by a first array of pixels;

couple, in the immersive reality headset, a second image portion into the waveguide in the headset display, the second image portion provided by a second array of pixels;

direct the first image portion out of the waveguide through an eyebox delimiting a location of a user's pupil;

direct the second image portion out of the waveguide through the eyebox; and tile, in a user's retina, the first image portion and the second image portion to form an image having an extended field of view, wherein the extended field of view includes an overlapping area comprising a light provided by pixels at an edge of the first array of pixels and a light provided by pixels at an edge of the second array of pixels, wherein directing the first image portion and the second image portion out of the waveguide through the eyebox comprises utilizing a grating adjacent to the waveguide to couple light out from the waveguide in a direction of the eyebox.

12. The system of claim 11, wherein to tile the first image portion and the second image portion to form an image having an extended field of view, the one or more processors execute instructions to tile the first image portion adjacent to the second image portion along at least one dimension in the user's retina.

13. The system of claim 11, wherein the one or more processors further execute instructions to select pixels from the first array of pixels such that the first image portion covers a vertical field of view from −45 degrees to +5 degrees, and the second image portion covers a vertical field of view from −5 degrees to +45 degrees.

14. The system of claim 11, wherein the one or more processors further execute instructions to gradually reduce to zero a brightness of a light provided by pixels from the first array of pixels that cover a vertical field of view from about −5 degrees to about +5 degrees.

15. The system of claim 11, wherein the one or more processors further execute instructions to adjust a brightness of the light provided by pixels at an edge of the first array of pixels and a brightness of the light provided by pixels at an edge of the second array of pixels to provide a uniform brightness to the image having an extended field of view, including the overlapping area.

16. A non-transitory, computer-readable medium storing instructions which, when executed by a processor, cause a computer to perform a method, the method comprising:

directing a first image portion generated by a first array of pixels in a virtual reality headset out of a waveguide through an eyebox delimiting a location of a user's pupil;

directing a second image portion generated by a second array of pixels in the virtual reality headset out of the waveguide through the eyebox;

tiling, in a user's retina, the first image portion and the second image portion to form an image having an extended field of view, wherein the extended field of view includes an overlapping area comprising a light provided by pixels at an edge of the first array of pixels and a light provided by pixels at an edge of the second array of pixels;

gradually reducing to zero a brightness of a light provided by pixels from the first array of pixels that cover a vertical field of view from 0 degrees to +5 degrees; and gradually increasing from zero a brightness of a light provided by pixels from the second array of pixels that cover a vertical field of view from −5 degrees to 0 degrees.

17. The non-transitory, computer-readable medium of claim 16, wherein gradually reducing to zero and gradually increasing from zero a light provided by pixels in the first array of pixels and the second array of pixels further comprises adjusting a brightness of the light provided by pixels at an edge of the first array of pixels based on a coupling efficiency of the waveguide for the light provided by pixels at the edge of the first array of pixels, to provide a uniform brightness to the image having an extended field of view, including the overlapping area.

18. The non-transitory, computer-readable medium of claim 16, wherein gradually reducing to zero and gradually increasing from zero a light provided by pixels in the first array of pixels and the second array of pixels comprises verifying that a brightness of the overlapping area is similar to a brightness of a non-overlapping area of the image having an extended field of view.

19. The non-transitory, computer-readable medium of claim 16, further comprising selecting pixels from the first array of pixels such that the first image portion covers a vertical field of view from about −45 degrees to about +5 degrees, and the second image portion covers a vertical field of view from about −5 degrees to about +45 degrees.

20. The non-transitory, computer-readable medium of claim 16, further comprising:

gradually reducing to zero a brightness of a light provided by pixels towards the edge of the first array of pixels; and gradually increasing from zero a brightness of a light provided by pixels towards the edge of the second array of pixels.

* * * * *